United States Patent [19]
Kakinami et al.

[11] Patent Number: 5,991,427
[45] Date of Patent: Nov. 23, 1999

[54] METHOD AND APPARATUS FOR DETECTING A LANE ON A ROAD

[75] Inventors: Toshiaki Kakinami, Nagoya; Yoshikatsu Kimura, Anjo; Ryo Inoue, Nagoya, all of Japan

[73] Assignee: Aisin Seiki Kabushiki Kaisha, Kariya, Japan

[21] Appl. No.: 08/903,729

[22] Filed: Jul. 31, 1997

[30] Foreign Application Priority Data

Jul. 31, 1996 [JP] Japan ..................................... 8-219384
Jul. 31, 1996 [JP] Japan ..................................... 8-219427

[51] Int. Cl.$^6$ ...................................................... G06K 9/00
[52] U.S. Cl. .......................... 382/104; 340/903; 348/119; 701/28; 701/301
[58] Field of Search ..................................... 382/104, 100, 382/107, 108, 153, 241, 266, 269, 286, 288, 316, 199, 291, 256; 56/10.2 F; 340/901, 576, 903; 342/69; 348/118, 119; 701/28, 300, 301, 93

[56] References Cited

U.S. PATENT DOCUMENTS

| | | | |
|---|---|---|---|
| 5,208,750 | 5/1993 | Kurami et al. | 701/28 |
| 5,245,422 | 9/1993 | Borcherts et al. | 348/119 |
| 5,465,079 | 11/1995 | Bouchard et al. | 340/576 |
| 5,485,381 | 1/1996 | Heintz et al. | 701/93 |
| 5,528,888 | 6/1996 | Miyamoto et al. | 56/10.2 F |
| 5,555,312 | 9/1996 | Shima et al. | 382/104 |
| 5,555,555 | 9/1996 | Sato et al. | 382/104 |
| 5,617,086 | 4/1997 | Klashinsky et al. | 340/903 |
| 5,708,427 | 1/1998 | Bush | 340/941 |
| 5,790,403 | 8/1998 | Nakayama | 701/28 |

FOREIGN PATENT DOCUMENTS 6-215137  6/1994  Japan .
9-96507  9/1997  Japan .

OTHER PUBLICATIONS

"A method to extract corresponding points in road image analysis" disclosed in the papers of electronic points in road image analysis disclosed in Electronic Information and Communication Committee, D–II vol. J72–D–11 No. 5, pp. 827–830, Pub. May, 1989.

"A Zero–Bank Algorithm for Inverse Perspective of a Road from a Single Image" (Proc. IEEE Interl. Conf. on Robotics and Automation, pp. 1444–1449, pub. Mar. 1987.

Primary Examiner—Jon Chang
Assistant Examiner—Jayanti K. Patel
Attorney, Agent, or Firm—Sughrue, Mion, Zinn Macpeak & Seas, PLLC

[57] ABSTRACT

The invention is directed to a method and apparatus for detecting a lane on a road, the latter of which includes an edge sensor (ED) for detecting edges indicative of boundaries of opposite sides of each lane, an edge memory (EM) for storing the edges to form a couple of continuous lines of edge groups indicative of the opposite boundaries of the lane, and an image processor (DP) for defining the opposite boundaries of the lane on a plane in a three-dimensional geometry. A center of curvature defining device (RC) defines a center of curvature to the opposite boundaries of the lane. An edge line extracting device (ES) divides the edge groups stored in the edge memory into a plurality of continuous regions each having a predetermined length along a concentric circle arc having the same center as the center of curvature, and extracts a pair of edge lines from each region. A tangent defining device (TL) defines a couple of tangents to the edge lines, and a normal defining device (NL) defines a normal to the tangents. Then, a segment setting device (SD) defines a couple of intersections of the normal with the tangents, and sets a line segment between the intersections as a segment of the lane. The image processor (DP) renews the opposite boundaries of the lane on the basis of the segment of the lane.

4 Claims, 15 Drawing Sheets

F I G. 10
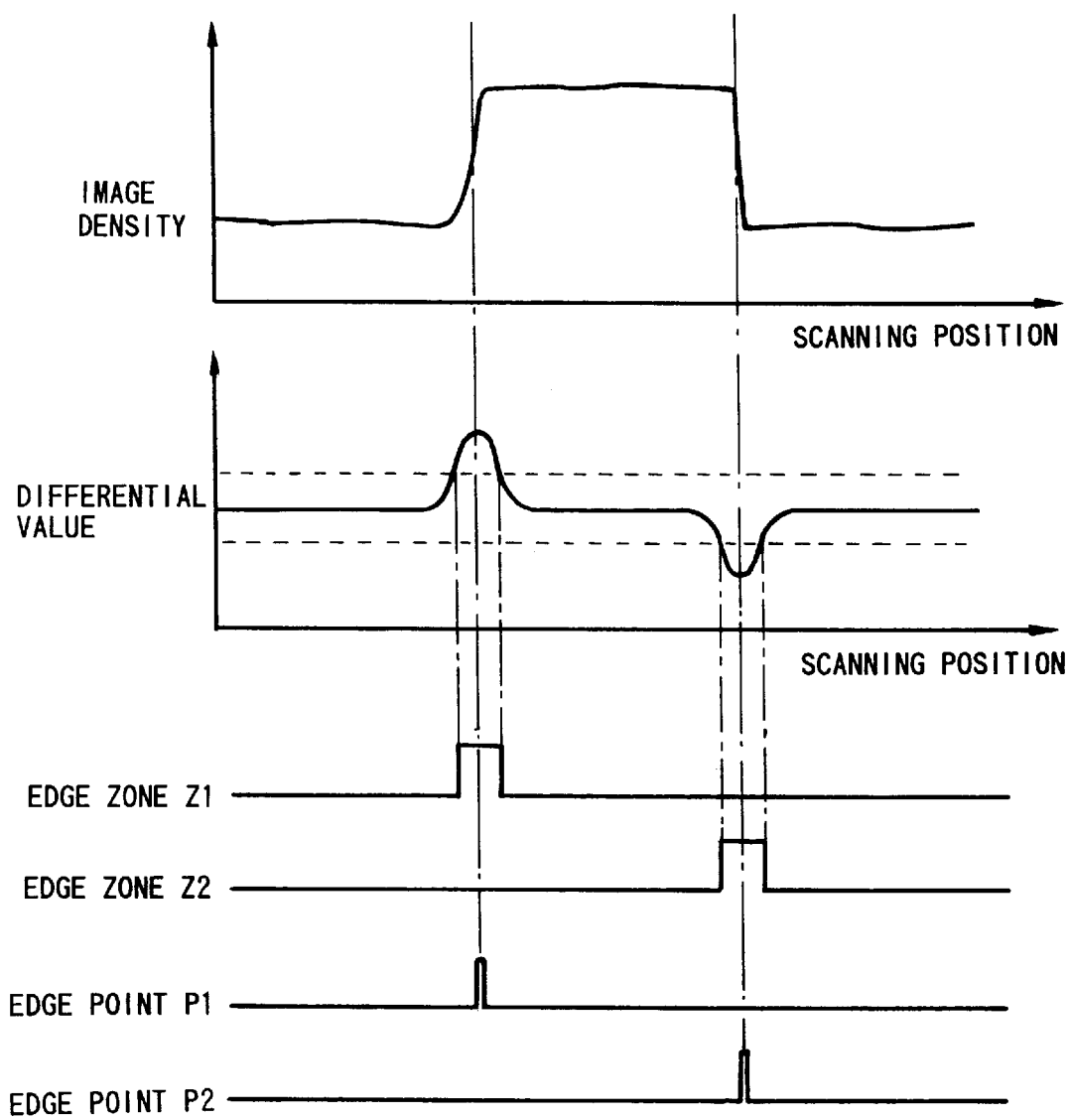

METHOD AND APPARATUS FOR DETECTING A LANE ON A ROAD

BACKGROUND OF THE INVENTION

1. Field of the Invention

The present invention relates to a method and apparatus for detecting a lane on a road, more particularly to the method and apparatus for detecting a lane on a road by defining boundaries of the opposite sides of the road, on the basis of image information in a visible region corresponding to a field of view of a vehicle driver.

2. Description of the Related Arts

In general, in order to define boundaries of a road geometrically, positions corresponding to white lines at the opposite sides (right and left sides) of the road are found. In practice, the positions having a common normal directed toward the center of curvature on a planar surface of a road are determined, so as to obtain tangents to the right and left white lines. An intersection of the normal with the tangent is called as a "corresponding point", and a line segment between the right and left corresponding points is called as a "road segment". If a plurality of road segments are obtained at a plurality of positions on the road, and arranged in parallel with each other, the road segments will form a plane corresponding to the surface of the road, and each segment directs a direction of the road at the position of the segment.

With respect to the above-described method for defining the boundaries of the road, an article entitled "A method to extract corresponding points in road image analysis" is disclosed in the papers of electronic information and communication committee, D-II Vol. J72-D-II No.5, pp.827–830, published in May, 1989. In that article, is proposed a method for obtaining a tangent vector T of a lane, then obtaining a unit segment vector S which is a normal to the tangent vectors at the right and left sides of the road, and seeking a combination of the tangent vectors to satisfy S·T=0, as shown in FIG. 19.

Another method is proposed in a paper entitled "A ZERO-BANK ALGORITHM FOR INVERSE PERSPECTIVE OF A ROAD FROM A SINGLE IMAGE" (Proc. IEEE Interl. Conf. on Robotics and Automation, pp.1444–1449, published in March, 1987). According to the method proposed in that paper, if M1–M2 and N1–N2 in FIG. 20 are found to be parallel, the other end of the initial cross-segment is taken to be the intersection R of the normal with the other edge segment M1–M2. If the two edge segments are not parallel, as can happen in turn as shown in FIG. 20, a kind of center of curvature C of the turn is found as the intersection of the normals to the midpoints of the two segments, and the width w of the road is calculated as the difference between CQ and CP. Then, the endpoint R of the initial cross-segment is taken at a distance w from its endpoint Q.

In the mean time, an image processing system is proposed for processing image information in a visible region in front of an automotive vehicle so as to be applied for various uses. According to Japanese Patent Laid-open Publication No. 6-215137, for example, it is proposed to provide an image processing system for detecting edge points in the image rapidly, which system is adapted to determine a scanning region by combining scanning line information such as a coordinate for beginning the scanning process and a coordinate for ending the scanning process, which are stored in a scanning table memory device. In practice, in order to detect boundaries of a white line extending ahead of a vehicle, theoretically it is sufficient to scan image data in a relatively narrow region to obtain edge points of the white line, because the region where the white line resides is generally limited to a certain narrow region. According to the proposed system, therefore, a scanning region which is called as a window is determined in accordance with the combination of the scanning line information such as the coordinate for beginning the scanning process and the coordinate for ending the scanning process, which are stored in a scanning table memory device.

With respect to the method for defining the boundaries of the road, the method disclosed in the former article requires repetition of the calculations until S·T=0, so that the response is to be improved. In the method disclosed in the latter paper, a small block of a curve road is represented by a trapezoid region, and the trapezoid region corresponding to the nearest road segment is added by next trapezoid region to extend the road segments. Therefore, if the road is dirty or the white lines are partially disappeared, the road segment may not be formed, so that the road segments can not be extended.

In the prior publications as described above, the boundaries of the road or the road segments are used. In general, a couple of parallel white (or other clear colours) lines are painted on the road to define the right and left boundaries of the road, so that a lane along which a vehicle travels is provided between the white lines. In other words, the lane of the road can be detected by defining the two white lines. In the present invention and embodiments, therefore, "lane segments", or simply "segments" are used in lieu of the road segments, and "boundaries of the lane" is used in lieu of the boundaries of the road. If the white lines are painted on the edges of the road, the lane is the same as the road.

In order to detect the lane shape of the road stably and accurately, it is desirable to set a plurality of lane segments from the nearest position toward a remote place therefrom with a constant distance spaced from each other, as described above. However, the white lines are not necessarily painted to be solid lines, but sometimes painted to be broken lines. Therefore, in the case where the road segment is set only in a predetermined limited region with respect to the image in front of the vehicle which travels on the road, if the white lines do not reside in that region, the road segment can not be set.

SUMMARY OF THE INVENTION

Accordingly, it is an object of the present invention to provide a method for detecting a lane accurately irrespective of the lane conditions on a road.

It is another object of the present invention to provide an apparatus for detecting a lane accurately irrespective of the lane conditions on a road.

In accomplishing these and other objects, a method for detecting a lane on a road comprises the steps of detecting edges indicative of boundaries of opposite sides of each lane on a road on the basis of a density of image information including the opposite sides of the lane, storing the edges in an edge memory to form a couple of continuous lines of edge groups indicative of the opposite boundaries of the lane, defining the opposite boundaries of the lane on a plane in a three-dimensional geometry, at least on the basis of the lines of the edge groups, defining a center of curvature to the opposite boundaries of the lane defined on the plane, dividing the edge groups stored in the edge memory into a plurality of continuous regions each having a predetermined length along a concentric circle arc having the same center as the center of curvature, extracting a pair of edge lines from each region, defining a couple of tangents to the edge lines extracted from each region, respectively, defining a normal to the tangents, defining a couple of intersections of the normal with the tangents, setting a line segment between the intersections as a segment of the lane, and renewing the opposite boundaries of the lane on the basis of the segment of the lane.

In the above method, the edges stored in the edge memory to form the continuous lines of edge groups indicative of the opposite boundaries of the lane is preferably divided into a plurality of continuous regions each having a predetermined length along a concentric circle arc having the same center as the center of curvature, with neighboring regions partially overlapped with each other, and extracting a pair of edge lines from each region. It is preferable that the tangents are a couple of tangents to the edge lines extracted from each region which are assumed to be parallel with each other, and a center of gravity of edges forming the edge lines is defined, and the normal is a normal including the center of gravity.

An apparatus for detecting a lane on a road may include an edge detection device for detecting edges indicative of boundaries of opposite sides of each lane on a road on the basis of a density of image information including the opposite sides of the lane, an edge memory for storing the edges to form a couple of continuous lines of edge groups indicative of the opposite boundaries of the lane, and an image processing device for defining the opposite boundaries of the lane on a plane in a three-dimensional geometry, at least on the basis of the lines of the edge groups. A center of curvature defining device is provided for defining a center of curvature to the opposite boundaries of the lane defined by the image processing device. And, an edge line extracting device is provided for dividing the edge groups stored in the edge memory into a plurality of continuous regions each having a predetermined length along a concentric circle arc having the same center as the center of curvature, and extracting a pair of edge lines from each region. Furthermore, a tangent defining device is provided for defining a couple of tangents to the edge lines extracted from each region, respectively by the edge line extracting device, and a normal defining device is provided for defining a normal to the tangents. Then, a segment setting device is provided for defining a couple of intersections of the normal with the tangents, and setting a line segment between the intersections as a segment of the lane to output the segment of the lane to the image processing device, and the image processing device is adapted to renew the opposite boundaries of the lane on the basis of the segment of the lane.

The edge line extracting device is preferably adapted to divide the edge groups stored in the edge memory into a plurality of continuous regions each having a predetermined length along a concentric circle arc having the same center as the center of curvature, with neighboring regions partially overlapped with each other, and extract a pair of edge lines from each region.

The apparatus may further include a center of gravity defining device for defining a center of gravity of edges forming the edge lines, and the tangent defining device is adapted to define the tangents to be extracted from each region which are assumed to be parallel with each other, and the normal defining device is adapted to define the normal to include the center of gravity.

BRIEF DESCRIPTION OF THE DRAWINGS

The above stated objects and following description will become readily apparent with reference to the accompanying drawings, wherein like reference numerals denote like elements, and in which:

FIG. 10 is a graph showing detection of edge points according to an embodiment of the present invention;

DESCRIPTION OF THE PREFERRED EMBODIMENTS

Figure 1:
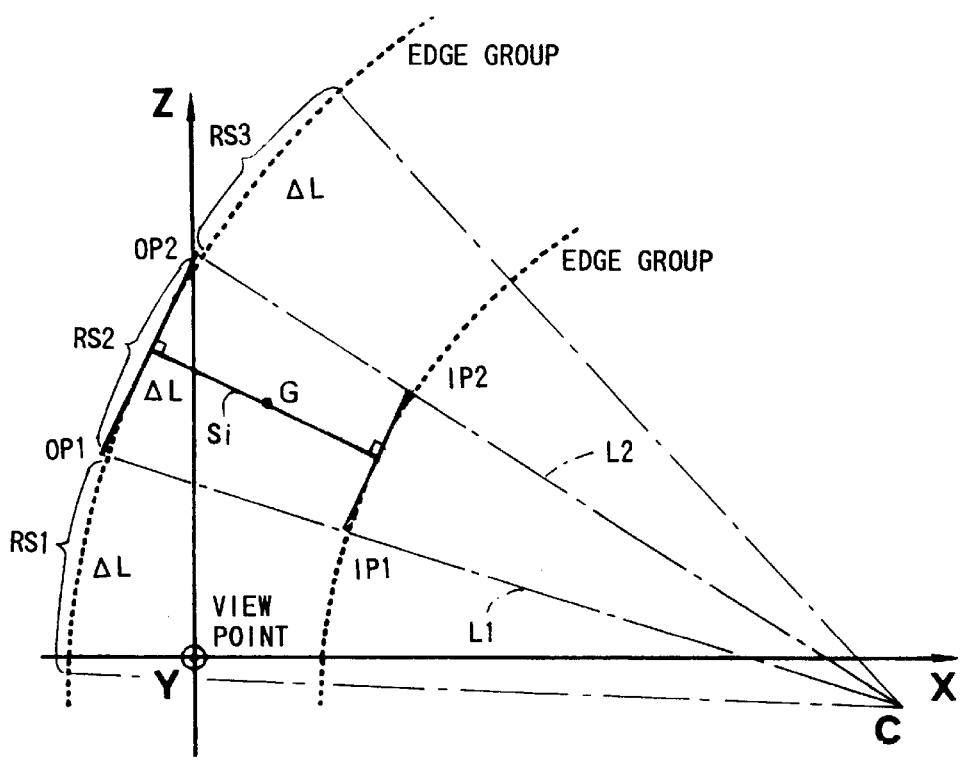
FIG. 1 is a diagram for showing a method for setting segments in an embodiment of a method for detecting a lane on a road according to the present invention.

Referring to FIG. 1, a basic concept of a method detecting a lane on a road according to an embodiment of the present invention will be explained. (1) At the outset, provided that a shape of a lane having white lines has been defined on the basis of image information obtained at a previous iteration step, and a center of curvature C to the lane has been defined, outer and inner (or, right and left) edge groups forming the white lines of the lane on a new image display are divided into a plurality of continuous regions RS1, RS2, RS3 and so on, each having a predetermined length Δ L along a concentric circle arc having the same center as the center of curvature C, and extract a pair of edge lines from each region. (2) A couple of tangents to the edge lines extracted from each region are obtained, respectively. In this respect, the tangents are defined by the least square method, provided that the edge lines extracted from each region are assumed to be parallel with each other, and a center of gravity G of edges forming the edge lines is obtained. (3) On the basis of those factors obtained in the above steps, a normal including the center of gravity G to the tangents is obtained, and a couple of intersections of the normal with the tangents are obtained. (4) Then, a line segment between the intersections is set as a segment Si of the lane. (5) And, the image which defined the shape of the lane is renewed, on the basis of the segment Si.

Accordingly, it is possible to determine whether the lane is straight or not, and calculate an average radius of curvature in a given region, direction of an object which resides ahead by a given distance, yaw angle and lateral displacement of a vehicle, width of a lane and so on. For example, if a length of a path from a view point of the vehicle driver to each segment S1 to Sn is set to be D1 to Dn, respectively, an intersection of lines extending from neighboring segments Si, Sj corresponds to the center of curvature C for a portion between the length of the path Di and the length of the path Dj, and the distance between the center of the curvature C and the segments Si, Sj may be indicted by Ri, Rj (not shown). Thus, the radius of curvature in the given region of the segments can be calculated. Then, if a curve is applied to trace a group of the right or left end points, or middle points of the segments, boundaries or the center line of the lane can be defined by an equation of the curve, so that a direction of the boundaries or the center line of the lane for a given length of the path can be obtained. Furthermore, if the curve is extended to the position of the view point, and the segment is obtained at this position, the yaw angle and lateral displacement of the vehicle, and width of the lane at the position of the view point can be obtained.

Figure 2:
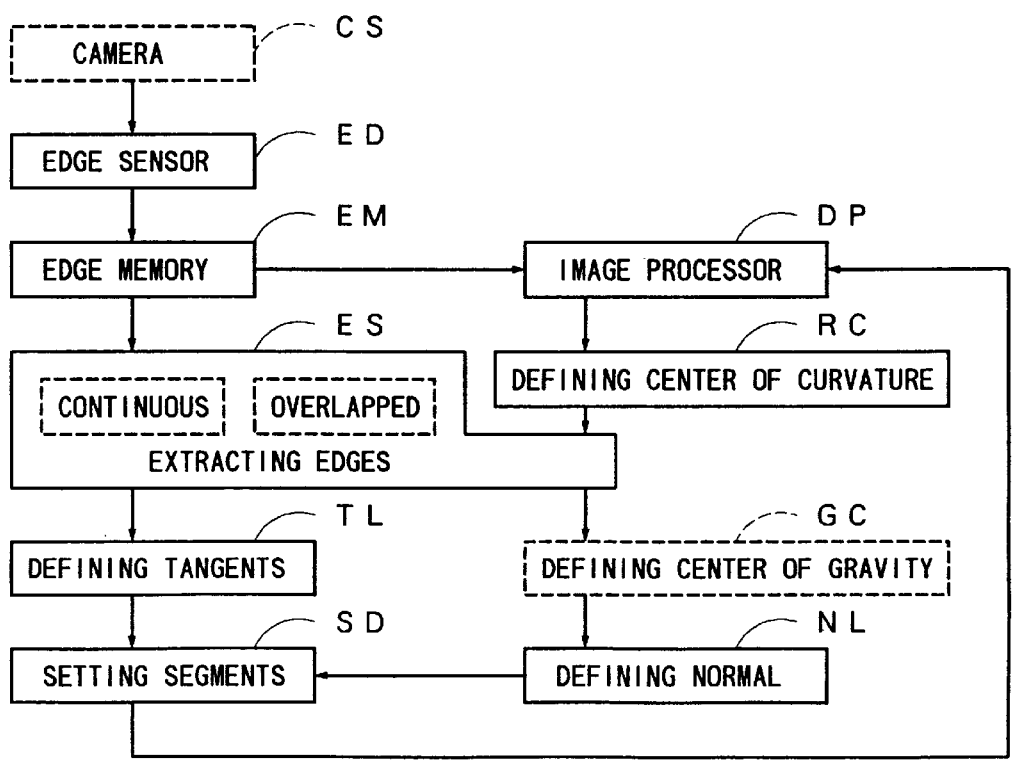
FIG. 2 is a block diagram of an apparatus for detecting a lane on a road according to an embodiment of the present invention.

FIG. 2 shows an embodiment of an apparatus for detecting a lane on a road (hereinafter, simply referred to as lane detection apparatus) which includes an edge sensor (ED) for detecting edges indicative of boundaries of opposite sides of each lane on a road on the basis of a density of image information including the opposite sides of the lane. An edge memory (EM) is provided for storing the edges to form a couple of continuous lines of edge groups indicative of the opposite boundaries of the lane. An image processor (DP) is provided for defining the opposite boundaries of the lane on a plane in a three-dimensional geometry, at least on the basis of the lines of the edge groups. A center of curvature defining device (RC) is provided for defining a center of curvature to the opposite boundaries of the lane defined by the image processor (DP). An edge line-extracting device (ES) is provided for dividing the edge groups stored in the edge memory to form the continuous lines of edge groups indicative of the opposite boundaries of the lane, into a plurality of continuous regions each having a predetermined length along a concentric circle arc having the same center as the center of curvature, and extracting a pair of edge lines from each region. A tangent defining device (TL) is provided for defining a couple of tangents to the edge lines extracted from each region, respectively by the edge line extracting device (ES). A normal defining device (NL) is provided for defining a normal to the tangents. And, a segment setting device (SD) is provided for defining a couple of intersections of the normal with the tangents, and setting a line segment between the intersections as a segment of the lane to output the segment of the lane to the image processor (DP). The image processor (DP) is adapted to renew the opposite boundaries of the lane on the basis of the segment of the lane.

The edge line extracting device (ES) may divide the edge groups stored in the edge memory to form the continuous lines of edge groups indicative of the opposite boundaries of the lane, into a plurality of continuous regions each having a predetermined length along a concentric circle arc having the same center as the center of curvature, with neighboring regions partially overlapped with each other, and extracting a pair of edge lines from each region. A center of gravity defining device (GC) may be provided for defining a center of gravity of edges forming the edge lines, and the tangent defining device (TL) may be adapted to define the tangents to be extracted from each region which are assumed to be parallel with each other, and the normal defining device (NL) may be adapted to define the normal to include the center of gravity.

Figure 3:
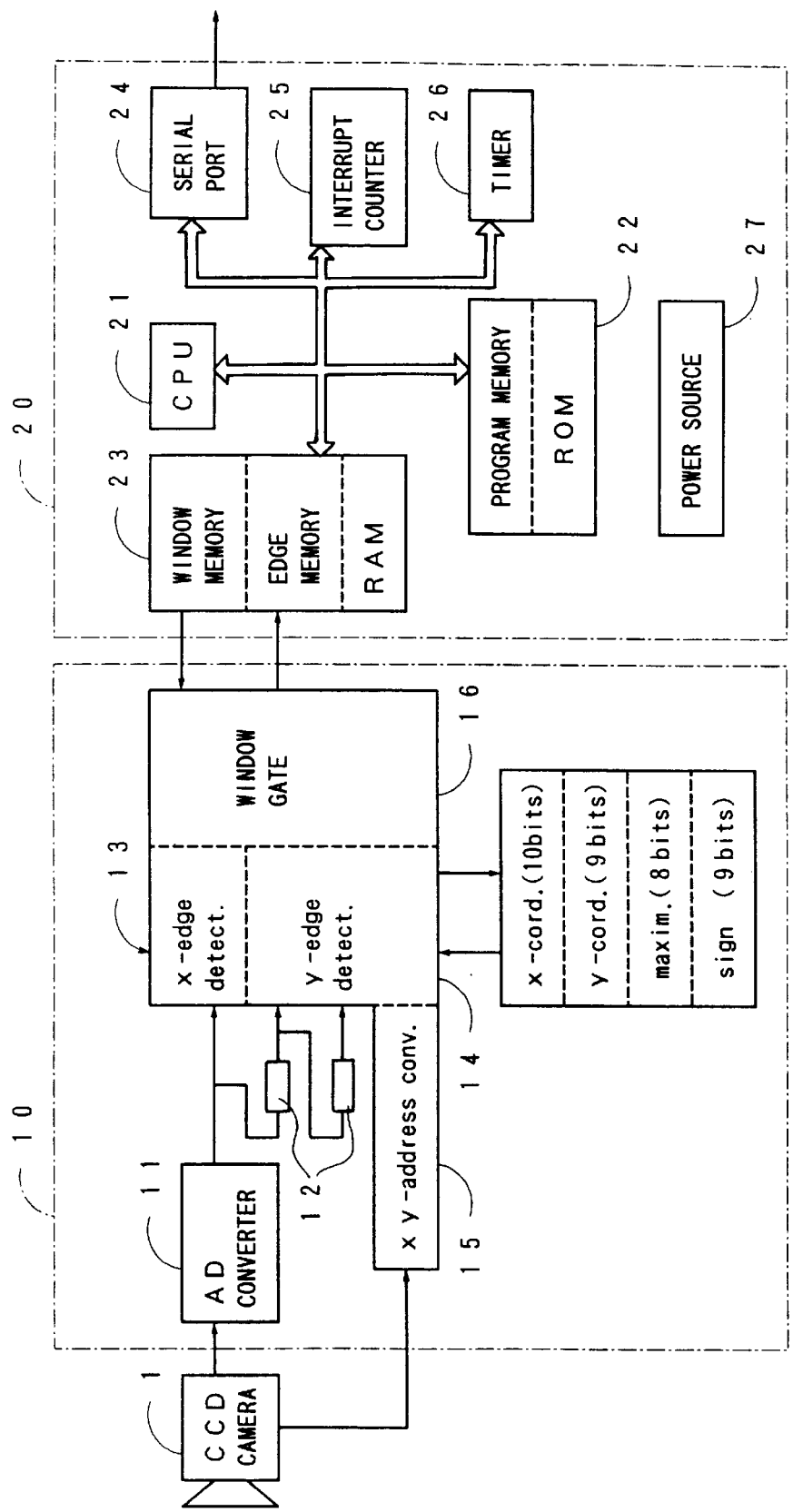
FIG. 3 is an overall block diagram of an apparatus for detecting a lane on a road according to an embodiment of the present invention.

More specifically, the details of the embodiment disclosed in FIG. 2 are illustrated in FIG. 3, wherein the lane detection apparatus is adapted to provide a desired image with respect to an object which resides in a visible region which corresponds to the front view of the vehicle driver, so as to detect the object and indicate it on an display. Referring to FIG. 3, the lane detection apparatus includes a CCD camera 1 having a CCD of a solid state image pick up device which is disposed in the vicinity of a view point of the driver in a compartment of the vehicle (not shown), to pick up the images in the front visible region. The image signals detected by the CCD camera 1 are analogue signals which are fed into an AD converter 11 in an edge detection section 10 to be converted into digital signals corresponding to a density of the image.

In the edge detection section 10, output signals from the AD converter 11 are fed through two line buffers 12 into a Sobel edge extracting operator 14 in a detection circuit 13 to detect an edge on the x-coordinate and an edge on the y-coordinate, respectively. Furthermore, an output signal from the CCD camera 1 is fed into a x-y address conversion section 15 as a synchronous signal. In this respect, ten bits are provided for defining the edge on the x-coordinate, while nine bits are provided for defining the edge on the y-coordinate. Eight bits are provided for defining the maximum value, and one bit is provided for defining a sign, i.e., positive or negative. The detection circuit 13 is provided with a window gate 16 which will be described later, and connected to an object determination unit 20. The edge detection section 10 may be formed by a gate array.

The object determination unit 20 is formed by a microcomputer which includes a CPU 21, ROM 22, RAM 23, serial port 24 for output, interruption counter 25, timer 26 and so on, which are connected with each other through an address bus and a data/control bus. A power source 27 is disposed in the object determination unit 20. The RAM 23 includes a window memory 23w and an edge memory 23e in FIG. 4. Data stored in the window memory 23w are fed into the window gate 16, and data extracted from the edge extracting operator 14 are fed into the window gate 16, so that a logical product (AND) of the both data is calculated in the window gate 16, and the logical product is fed into the edge memory 23e to be stored therein.

Figure 9:
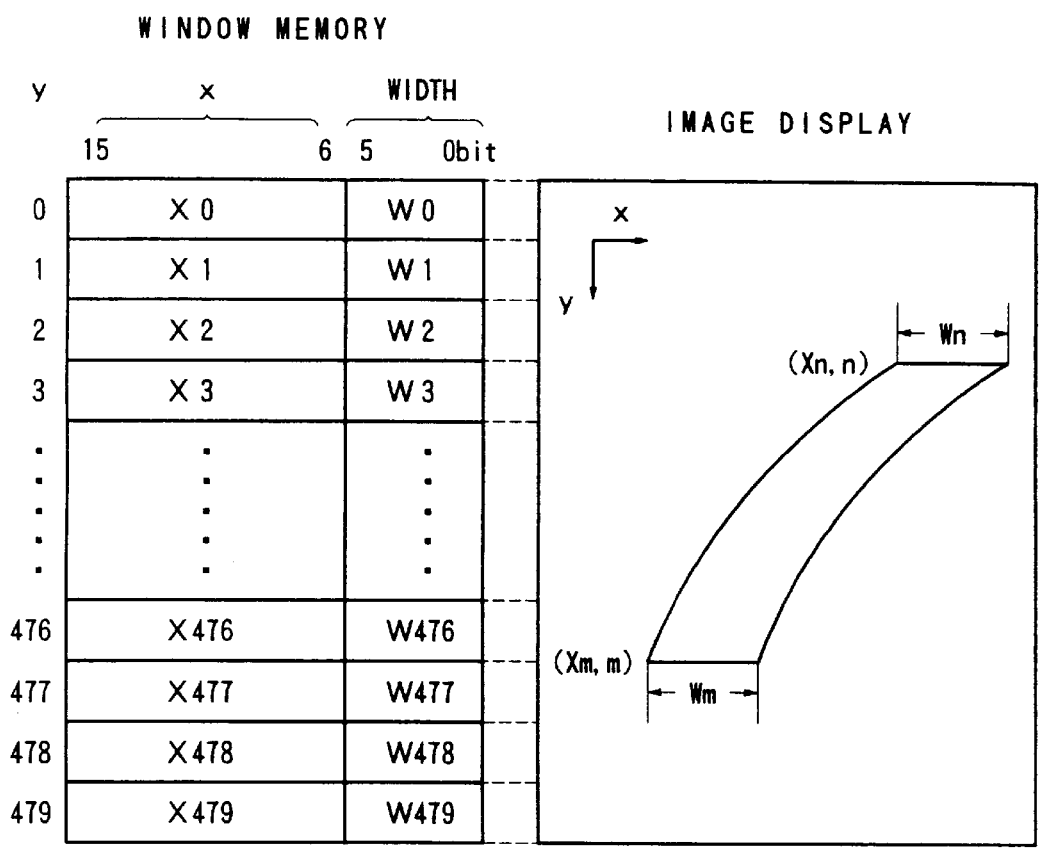
FIG. 9 is a diagram of a table memory for setting a window according to an embodiment of the present invention.

Referring to FIG. 9, an example of the table memory for setting a window used in the window memory 23w will be explained hereinafter. Addresses of 0 to 479 are given to 480 scanning lines extending horizontally or vertically, in parallel with the x-coordinate according to the example as shown in FIG. 9, respectively. Every address is given the x-coordinate or y-coordinate of at least a reference point, one of X0 to X479 on the x-coordinate according to the example in FIG. 9, and a predetermined width for each reference point, one of W0 to W479 according to the example in FIG. 9, which are stored in the memory. In FIG. 9, the left upper corner on a rectangular display is given the x-y coordinate of (0,0), and the right lower corner on the display is given the x-y coordinate of (639, 479). If 16 bits are employed in the table memory, 10 bits are used for setting the x-coordinate of the window, and 6 bits are used for setting the width of the window as shown in FIG. 9. If 32 bits are employed in the table memory, however, the width of the window may be set as broad as the full width of the display.

Figure 4:
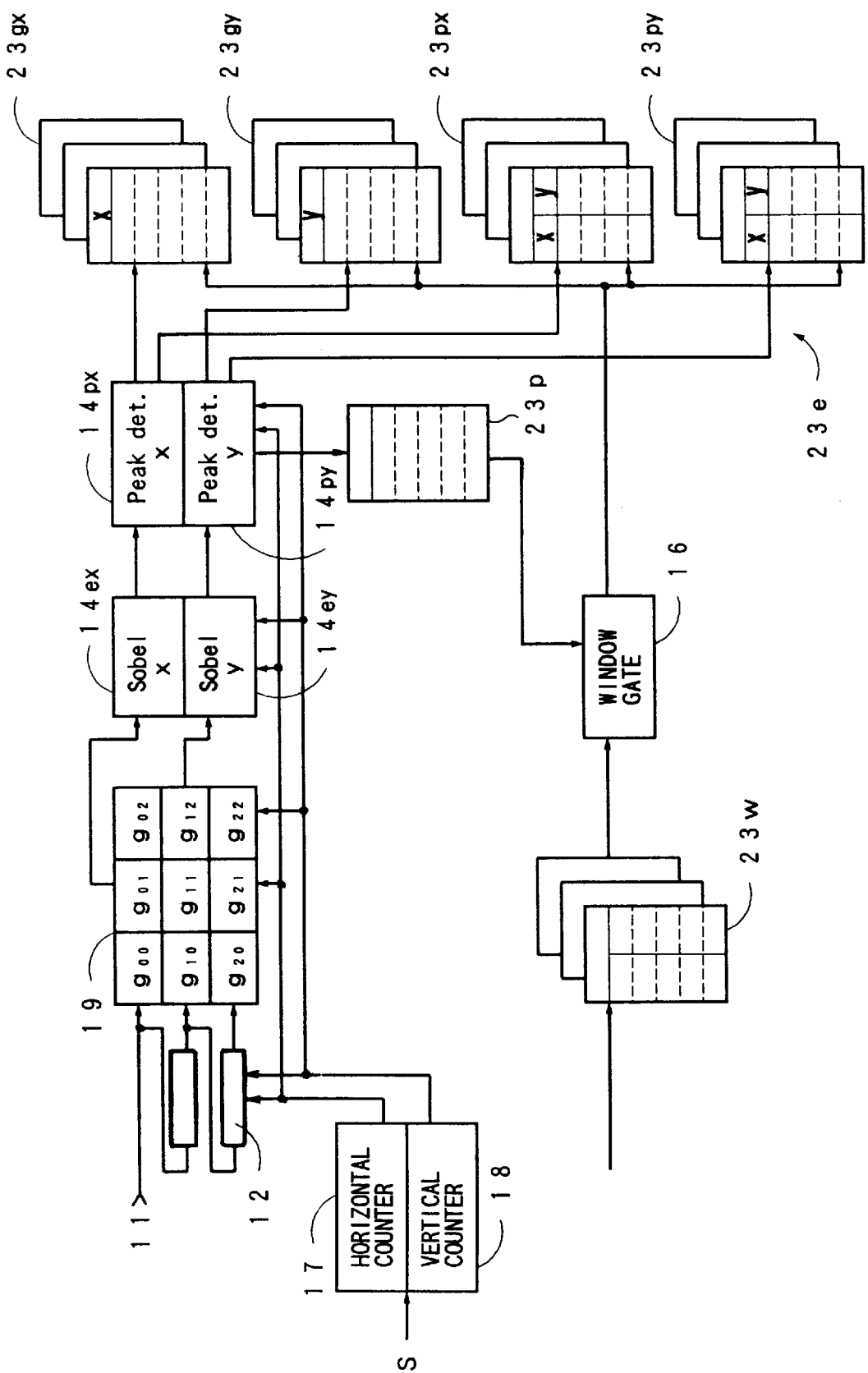
FIG. 4 is a block diagram of an edge detection section according to an embodiment of the present invention.

Referring to FIG. 4 which illustrates a functional block diagram for detecting the edges, a synchronous signal S is fed through a horizontal counter 17 and a vertical counter 18 into two line buffers 12, 3×3 matrix resister 19, Sobel edge extracting operators 14*ex*, 14*ey*, and peak detectors 14*px*, 14*py*. Accordingly, the image data with three scanning lines are fed through two line buffers 12 into the 3×3 matrix resister 19, so that the edges on the x-coordinate and the y-coordinate of the two-dimensional image display are detected, and the peak values detected by the peak detectors 14*px*, 14*py* are fed into the edge memory 23*e*. A peak detection memory 23*p* is provided for obtaining the peak value on the y-coordinate. The logical product (AND) of the value stored in the peak detection memory 23*p* and the value stored in the window memory 23*w* when the peak was determined in the window gate 16, is obtained, so that the position and width of the window are fed into the edge memory 23*e*. The edge memory 23*e* has a density memory 23*gx* on the x-coordinate and a density memory 23*gy* on the y-coordinate, and also a coordinate memory 23*px* on the x-coordinate and a coordinate memory 23*py* on the y-coordinate, in which the peak values of the edge are stored, respectively.

Figure 5:
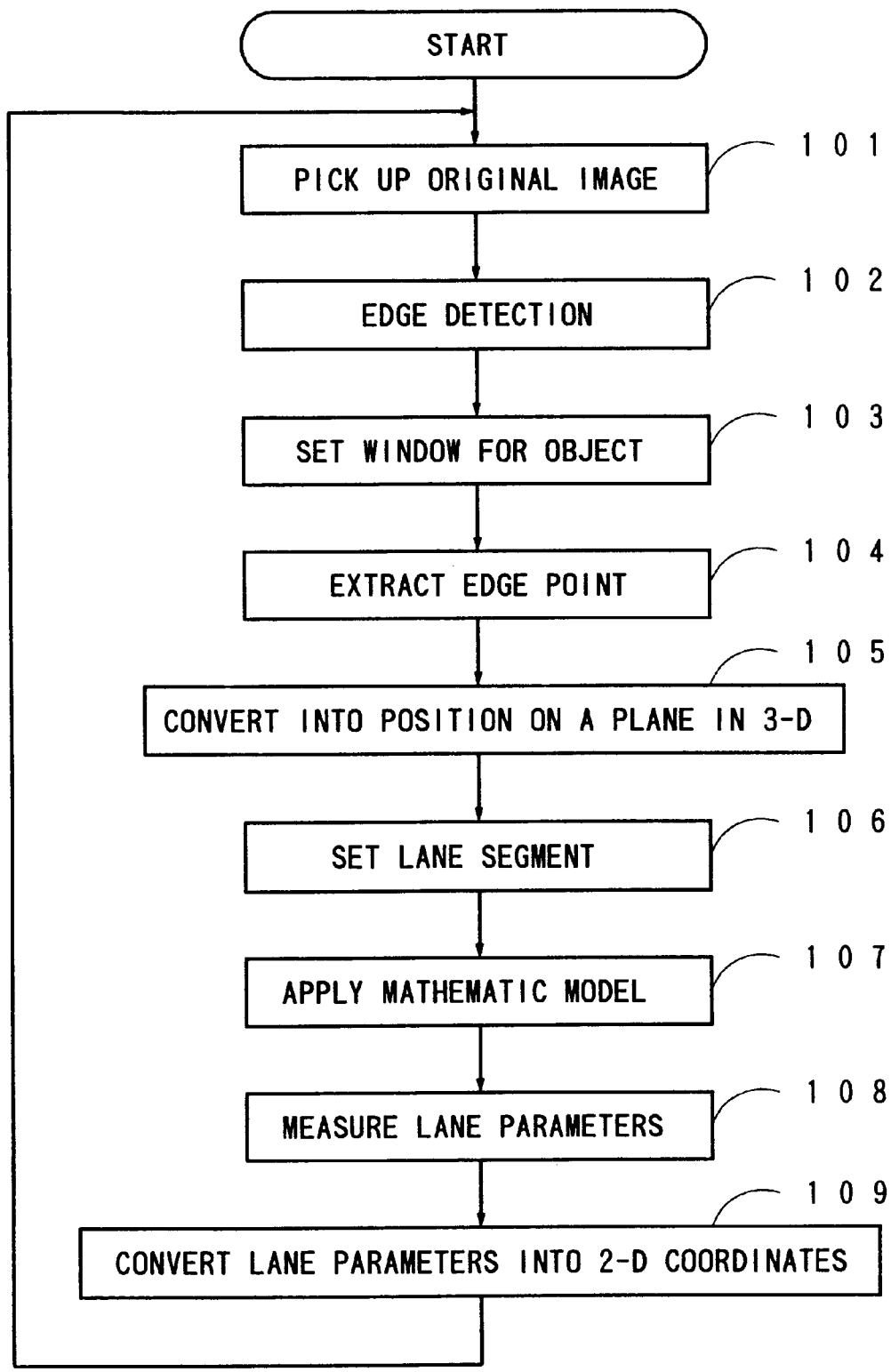
FIG. 5 is a flowchart for image processing according to an embodiment of the present invention.

According to the above-described embodiment, the image processing is performed in accordance with flowcharts as shown in FIGS. 5 to 8. Referring to FIG. 5, at Step 101, all of the image signals output from the CCD camera 1 are fed through the AD converter 11 and the line buffer 12 into the detection circuit 13 to introduce the image information. Then, the edges are detected at Step 102. According to the present embodiment, edge points are obtained on the basis of the edges as shown in FIG. 10, and the x-coordinate and y-coordinate of each edge point are specified. At Step 103, the window is set for the object at the present iteration step of the image processing, as will be described later with reference to FIG. 6.

FIG. 10 shows a method for extracting the edge points. At the outset, the signal indicative of the density of the image is differentiated to provide a differential value (peak value) which is processed by a binary processing in accordance with a predetermined threshold level to form edge point zones Z1, Z2. Then, in the middle of the edge point zones Z1, Z2, edge points P1, P2 are obtained by a process for narrowing the zones, respectively, for defining the outline of the object. While the edge points are used in the present embodiment, in addition to the edges which are generally used for defining the outline, the edges may be used as they are. Then, the program proceeds to Step 104 where the logical product (AND) of the edge points obtained on the basis of the edges at Step 102 and the window for the object set at Step 103, to extract the edge points which reside in the window. Then, the program further proceeds to Step 105 and Steps following it, which perform a specific process for the object which forms a curve or a straight line, e.g., a generally white, solid or broken line having a constant width for use in a vehicle lane on a road, which is abbreviated as a white line hereinafter.

Figure 11:
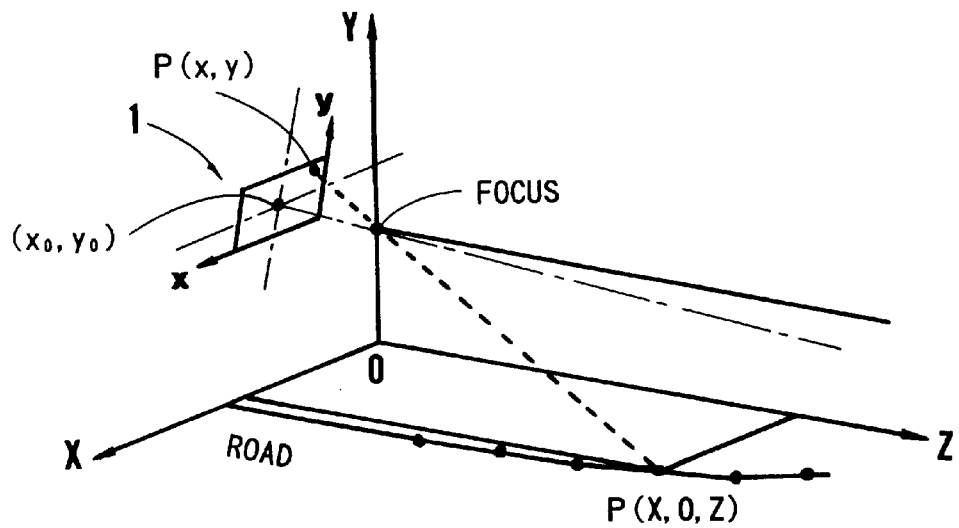
FIG. 11 is a diagram of coordinate systems showing edge points which are converted into positions on a plane in a three-dimensional geometry according to an embodiment of the present invention.
Figure 12:
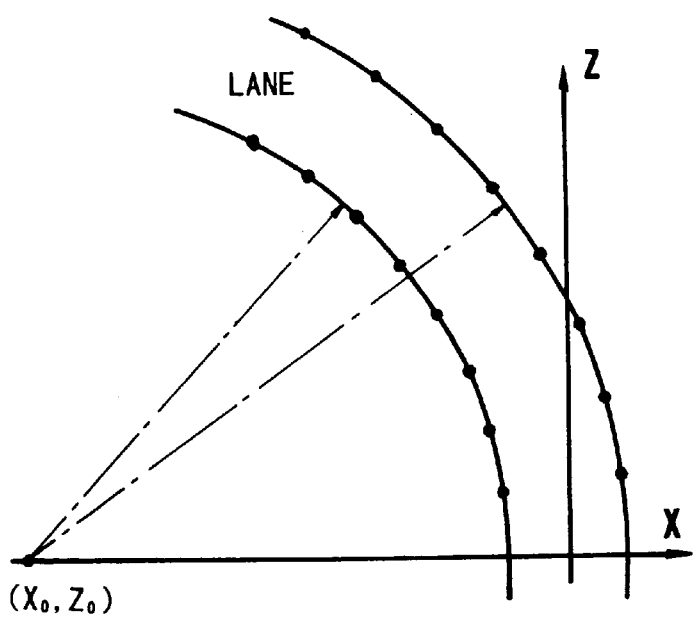
FIG. 12 is a diagram of coordinate systems showing edge points which are converted into positions on a plane in a two-dimensional geometry according to an embodiment of the present invention.

At Step 105, the edge points on the image display which were extracted at Step 104 are converted into positions on the plane in the three-dimensional geometry, such that the edge points reside on a road surface, as shown in FIGS. 11, 12. While the coordinate axes x, y of the two-dimensional geometry, the coordinate axes X, Y, Z are used for the three-dimensional geometry in FIGS. 11, 12. By means of the edge points converted into the positions on the plane in the three-dimensional geometry, lane segments are defined at Step 106, which will be described later with reference to FIGS. 7, 8. Then, a mathematic model is applied to the arrangement of the segments at Step 107, and the program proceeds to Step 108 where parameters indicative of a shape of the lane such as a radius of curvature, width of lane and the like are measured in accordance with the mathematic models applied to the arrangements of the segments. At Step 108, the center of curvature is defined by a plurality of segments defined at the present iteration step, for example. Then, the program further proceeds to Step 109 where the parameters indicative of the shape of the lane are converted into the two-dimensional coordinates to provide for setting the window for the object at the next iteration step.

Figure 6:
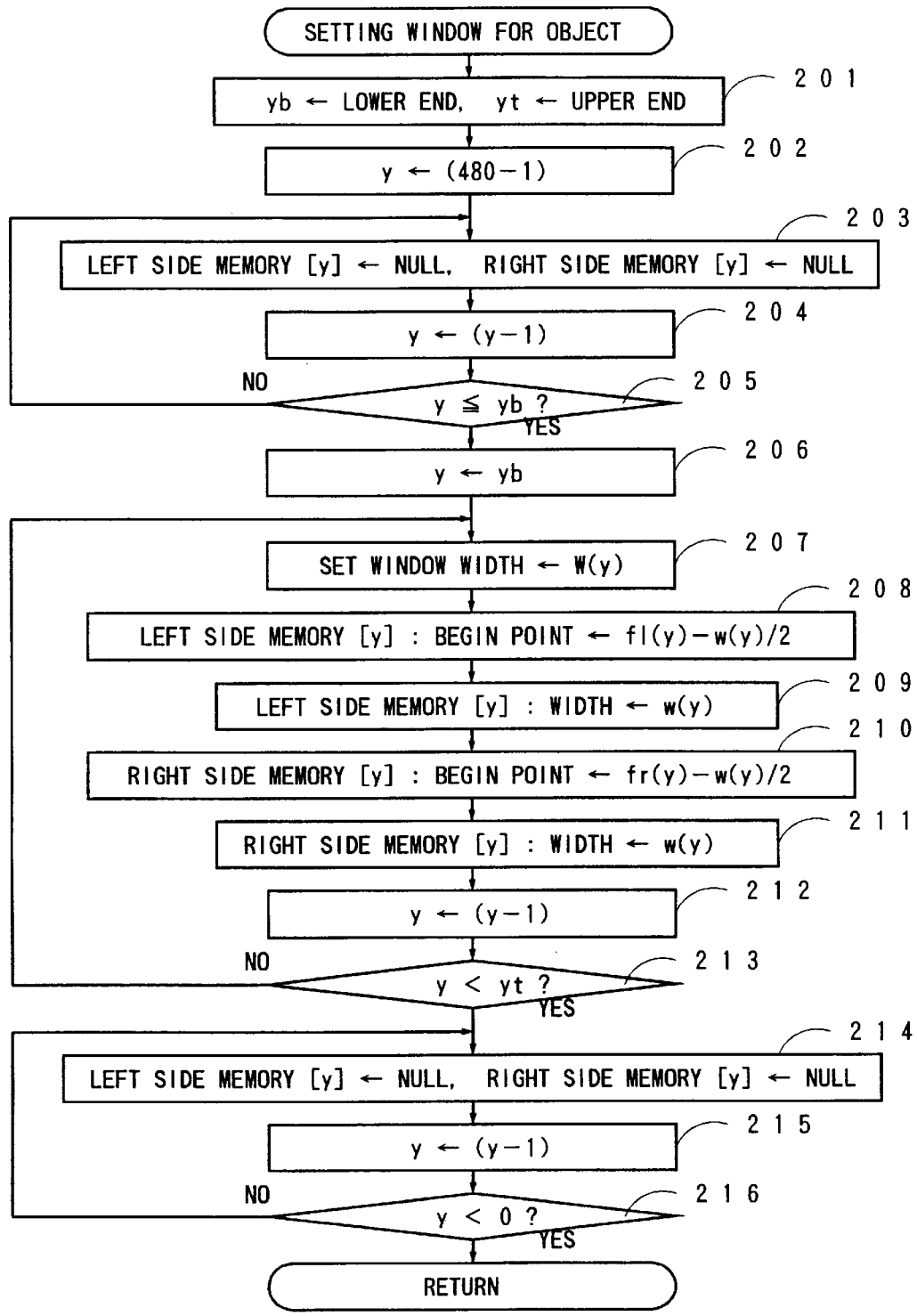
FIG. 6 is a flowchart for setting a window for an object according to an embodiment of the present invention.

The window for the object is set at Step 103 in accordance with a process as shown in FIG. 6. At the outset, values for setting an upper end and a lower end of the axis of ordinate (y-axis) of the window for the object (hereinafter, simply referred to as the window) are set as predetermined values yb, yt (e.g., yb$\geq$0, yt$\leq$479) at Step 201, respectively, and a value of a position y on the y-axis is set to provide the lowest end (y=480−1=479) at Step 202. Then, at Step 203, a memory [y] for setting a left side window and a memory [y] for setting a right side window are cancelled (NULL). After the value y on the y-axis is decremented (y−1) at Step 204, the value y is compared with the predetermined value yb at Step 205, and Steps 203 and 204 are repeated until the value y becomes equal to or less than the predetermined value yb. When the value y becomes equal to or less than the predetermined value yb, the program proceeds to Step 206 where the value y is set to be the predetermined value yb. Thus, the lowest end of the image display is set, so that the process at Step 207 and Steps following it start from the lowest end (yb) of the image display.

At Step 207, the width of the window is set to be w(y). The width w(y) of the window may be constant, i.e., w(y)=Ky, where Ky is constant as shown in FIG. 10, or may be constant on the plane in the three-dimensional geometry as shown in FIG. 11. The width w(y) of a remote portion of the window may be broadened as shown in FIG. 12. Then, at Step 208, the beginning point in the memory [y] for setting the left side window is set to be [fl(y)−w(y)/2], where fl(y) indicates the previous value of the center of the left white line on the plane in the two-dimensional geometry. At Step 209, the width in the memory [y] for setting the left side window is set to be w(y). Also, at Step 210, the beginning point in the memory [y] for setting the right side window is set to be [fr(y)−w(y)/2], where fr(y) indicates the previous value of the center of the right white line on the plane in the two-dimensional geometry. At Step 211, the width in the memory [y] for setting the right side window is set to be w(y). According to the present invention, therefore, the shape of the window is defined by the reference point (beginning point) and the width. The beginning point and end point may be set to define the shape of the window, instead.

After the value y on the y-axis is decremented (y−1) at Step 212, the value y is compared with a predetermined value yt indicative of the upper end of the window at Step 213, so that Steps 207 to 212 are repeated until the value y becomes less than the predetermined value yt. When the value y becomes less than the predetermined value yt, the program proceeds to Step 214. As a result, the value y exceeds the predetermined upper limit set on the image display, the program proceeds to Step 214 where the memory [y] for setting the left side window and the memory [y] for setting the right side window are cancelled. After the value y on the y-axis is decremented (y−1) at Step 215, the value y is compared with "0" at Step 216, and Steps 214 and 215 are repeated until the value y becomes less than "0". When the value y becomes less than "0", the program returns to the routine as shown in FIG. 5.

Figure 7:
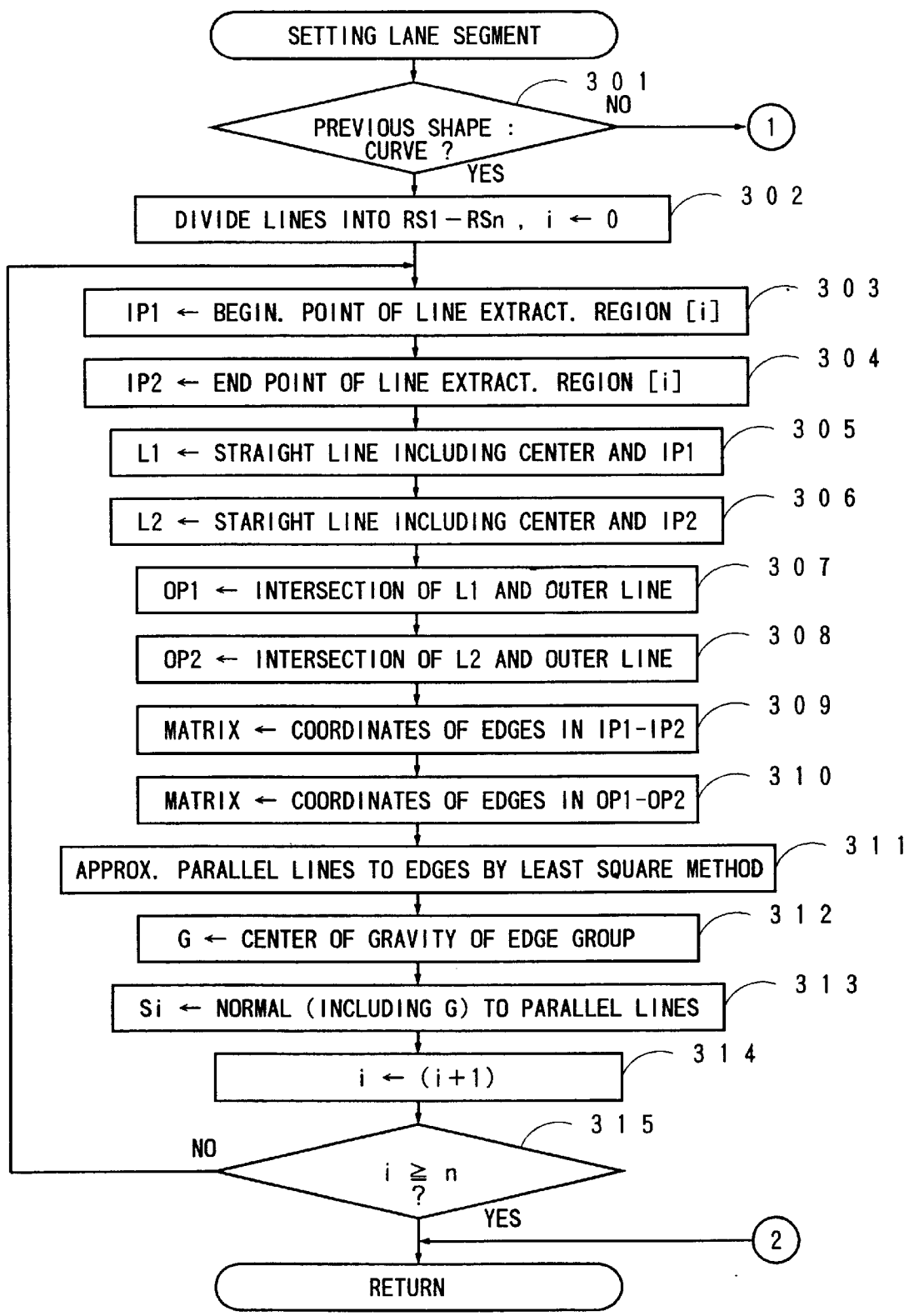
FIG. 7 is a flowchart for setting a segment according to an embodiment of the present invention.
Figure 8:
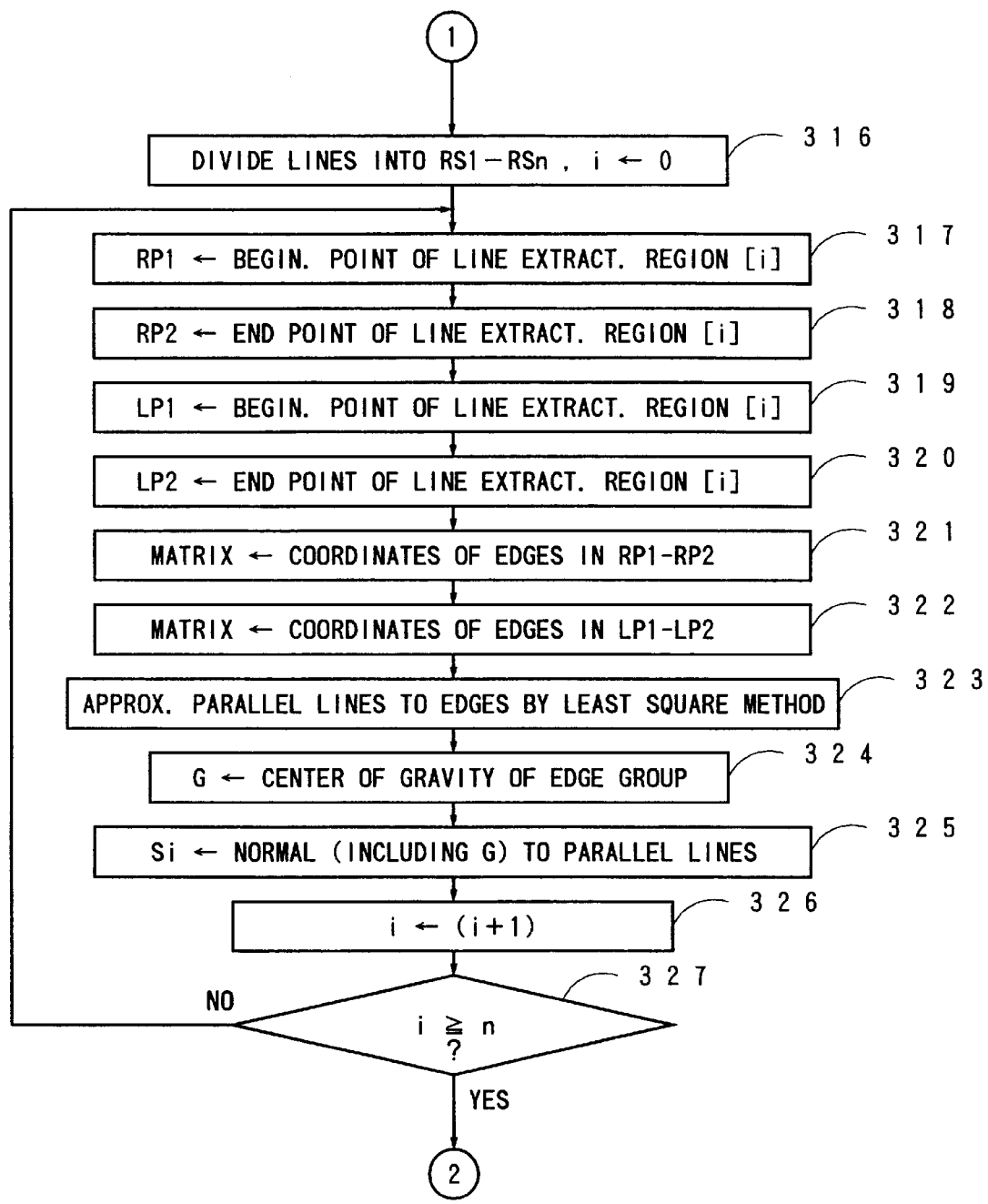
FIG. 8 is a flowchart for setting a segment according to an embodiment of the present invention.

The setting of the lane segment is performed at Step 106 in FIG. 5 in accordance with the process as shown in FIGS. 7 and 8. At Step 301, it is determined whether the two white lines of edges displayed at the previous iteration step are curved, or not. If it is determined that the lines are curved, the program proceeds to Step 302, whereas if it is determined that lines are not curved, the program proceeds to Step 316 (in FIG. 8). At Step 302, a center of curvature of the white line is defined on the basis of the previous display, and the edges stored in the edge memories for forming the two continuous lines of edge groups are divided into a plurality of continuous regions RS1 to RSn, by every predetermined length Δ L, along a concentric circle arc having the same center as the center of curvature, and a reference i indicative of the region is cleared. Then, with respect to the white line located at the inside of the curve, a beginning point of the region RSi of the reference i is set to be IP1 at Step 303, and an end point of the region RSi is set to be IP2 at Step 304. Then, the program proceeds to Step 305 where a straight line L1 is set to include the beginning point IP1 and the center C of the circle arc displayed on the previous image as shown in FIG. 1, and a straight line L2 is set to include the end point IP2 and the center C at Step 306. Then, the program proceeds to Steps 307, 308, where an intersection of the straight line L1 with the white line located at the outer side of the curve is set to be OP1, and an intersection of the straight line L2 with the white line located at the outer side of the curve is set to be OP2.

Then, the coordinates of the edges forming the white line between the intersections IP1 and IP2 are given to a matrix for operating the least square method at Step 309, and the coordinates of the edges forming the white line between the intersections OP1 and OP2 are given to a matrix for operating the least square method at Step 310. Based on the result of these calculations, parallel lines are approximated to the edges forming the edge lines by means of the least square method, thereby to define two tangents at Step 311. At Step 312, a center of gravity G of the edges forming the pair of edge lines is obtained, and the normal to the parallel lines including the center of gravity G is set to be "Si" at Step 313. That is, a line segment between the parallel lines is provided for a segment Si of the lane. After this process has been finished, the number of region i is incremented (+1), and Steps 303 to 314 are repeated until the number of region i becomes a certain number n.

If it is determined at Step 301 that the two white lines of edges displayed at the previous iteration step are straight, the program proceeds to Step 316 in FIG. 8, where the edges stored in the edge memories for forming the two continuous lines of edge groups are divided into a plurality of continuous regions RP1 to RPn, and the reference i indicative of the region is cleared. Then, with respect to the white line located at right for example, the beginning point of the region RSi of the reference i is set to be RP1 at Step 317, and the end point of the region RSi is set to be RP2 at Step 318. Then, the program proceeds to Steps 319, 320 where the beginning point of the region RSi of the reference i is set to be LP1 at Step 319, and the end point of the region RSi is set to be LP2 at Step 320, respectively. Then, the coordinates of the edges forming the white line between the beginning point RP1 and the end point RP2 are given to a matrix for operating the least square method at Step 321, and the coordinates of the edges forming the white line between the beginning point LP1 and the end point LP2 are given to a matrix for operating the least square method at Step 322. Based on the result of these calculations, parallel lines are approximated to the edges forming the edge lines by means of the least square method, thereby to define two tangents at Step 323. At Step 324, the center of gravity G of the edges forming the pair of edge lines is obtained, and the normal to the parallel lines including the center of gravity G is set to be "Si" at Step 325. That is, a line segment between the parallel lines of the normal is provided for a segment Si of the lane. After this process has been finished, the number of region i is incremented (+1), and Steps 317 to 326 are repeated until the number of region i becomes the number n.

According to the present embodiment, the lane segments are set without repetition of the calculations as described above, so that the system is formed at a relatively low cost. Furthermore, since it is a prerequisite condition that the tangents to the white lines at the opposite sides are parallel, the system is not easily affected by the noise such as dirty surface of the white line or the road comparing with the prior method for obtaining the tangent for each white line. According to the present embodiment, a plurality of segments S1, S2, S3 and so on are continuously set for a plurality of regions RS1, RS2, RS3 and so on which were divided in advance. Therefore, even if it is caused to be difficult to set the segments in a part of the regions, appropriate segments can be set continuously and approximately equally spaced from each other, without causing affects on the segments in other regions. Furthermore, if such a prerequisite is included that the width of the lane is constant, the noise will be further decreased.

Figure 13:
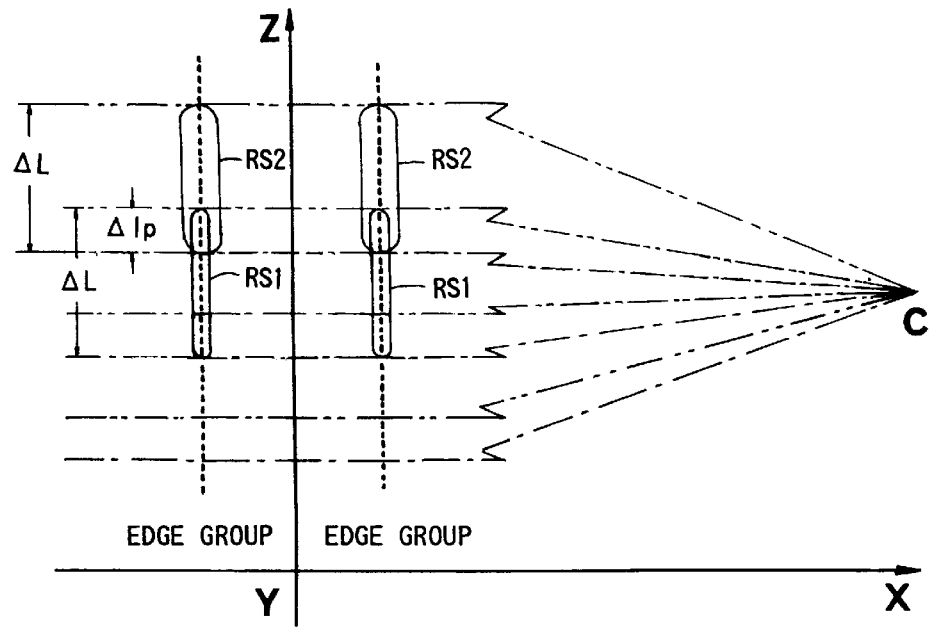
FIG. 13 is a diagram for showing a method for setting segments in another embodiment of a method for detecting a lane on a road according to the present invention.

FIG. 13 illustrates another embodiment which is adapted to overlap the regions RS1, RS2 and so on for setting a plurality of segments S1, S2 and so on, with each other. Referring to FIG. 13, the regions are set, when the edge groups are aligned along a straight line. According to the present embodiment, the neighboring regions RS1, RS2 are overlapped in part, as indicated by Δ Ip. The rest of the constitution is the same as that of the former embodiment, so that the explanation about it will be omitted.

Figure 14:
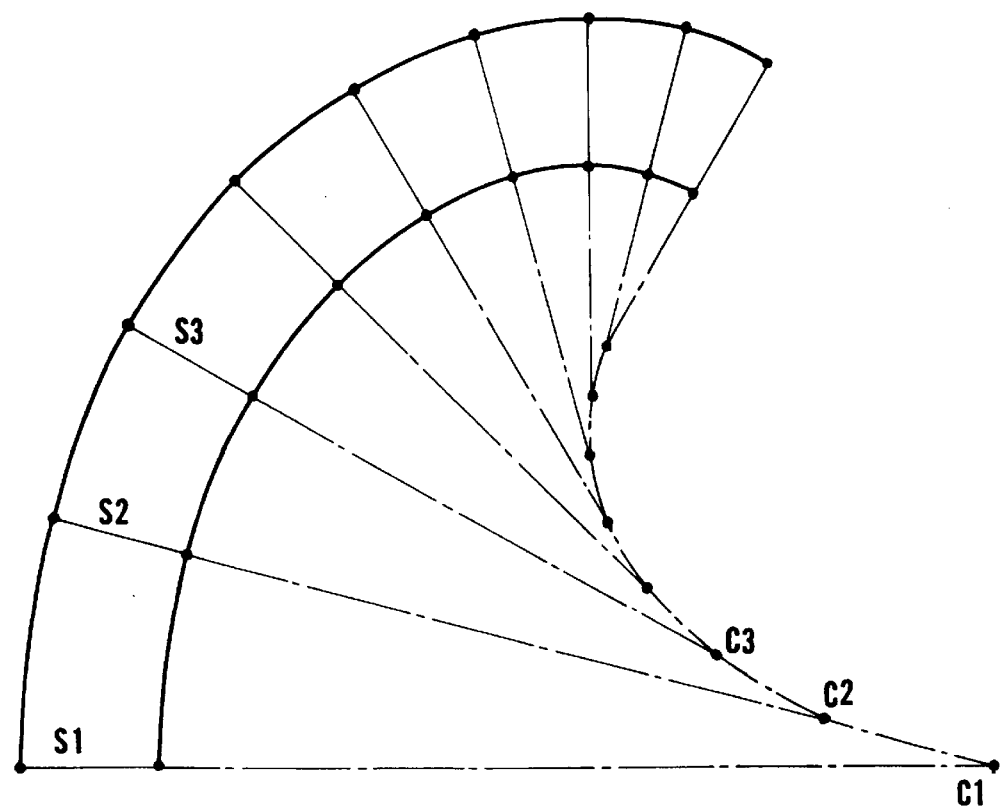
FIG. 14 is a diagram for showing a method for setting segments in a further embodiment of a method for detecting a lane on a road according to the present invention.

FIG. 14 illustrates a further embodiment which is adapted to gradually reduce the length of the region to be divided along the curve of the lane, so that Δ L is not constant. Therefore, although the center of the curvature will move from its initial position C1 to positions C2, C3 and so on, the segments S1, S2, S3 and so on will be set basically in the same manner as explained before.

In the mean time, there is no disclosure about a method for obtaining the tangents to detect a correct road segment in the prior art, as described before. In order to obtain the correct road segment, it is necessary to pick up edges of the white lines at right and left sides of the road in a region of an equal length of a path, and obtain the tangents to the boundaries of the road in that region. For example, it is necessary to pick up a combination of the right and left white lines in an equal distance region with respect to a straight road, while it is necessary to pick up a combination of the white lines in the region of the equal distance along the road with respect to a curve road. In other words, it is necessary in the latter case to pick up a combination of the white lines in concentric circular arc regions with an equal arc angle to the common center of the curvature. If the right and left white lines do not reside in the region of the equal distance along the road, however, it is necessary to find out a combination of the right and left white lines parallel to each other, which necessarily increases the iteration of calculation.

In order to solve the above problem in the prior art, and set the segments without unnecessary iteration of calculating steps, a further embodiment may be constituted as shown in FIGS. 15 to 18, in which elements equivalent to those described originally will be designated by corresponding reference numerals.

Figure 16:
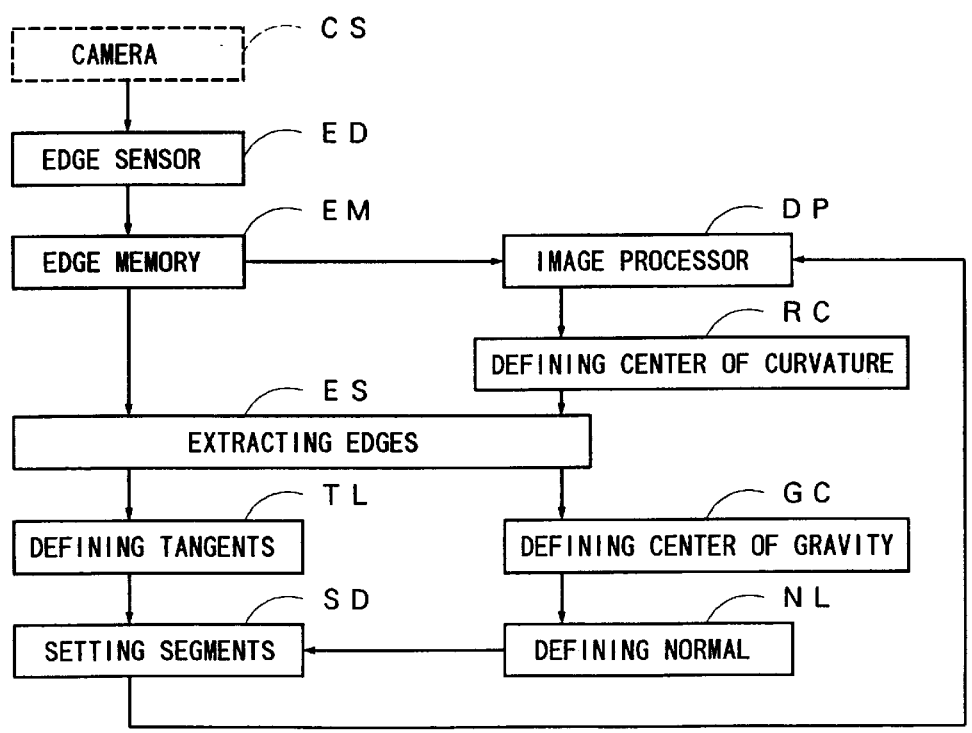
FIG. 16 is a block diagram of an apparatus for detecting a lane on a road according to a further embodiment of the present invention.
Figure 17:
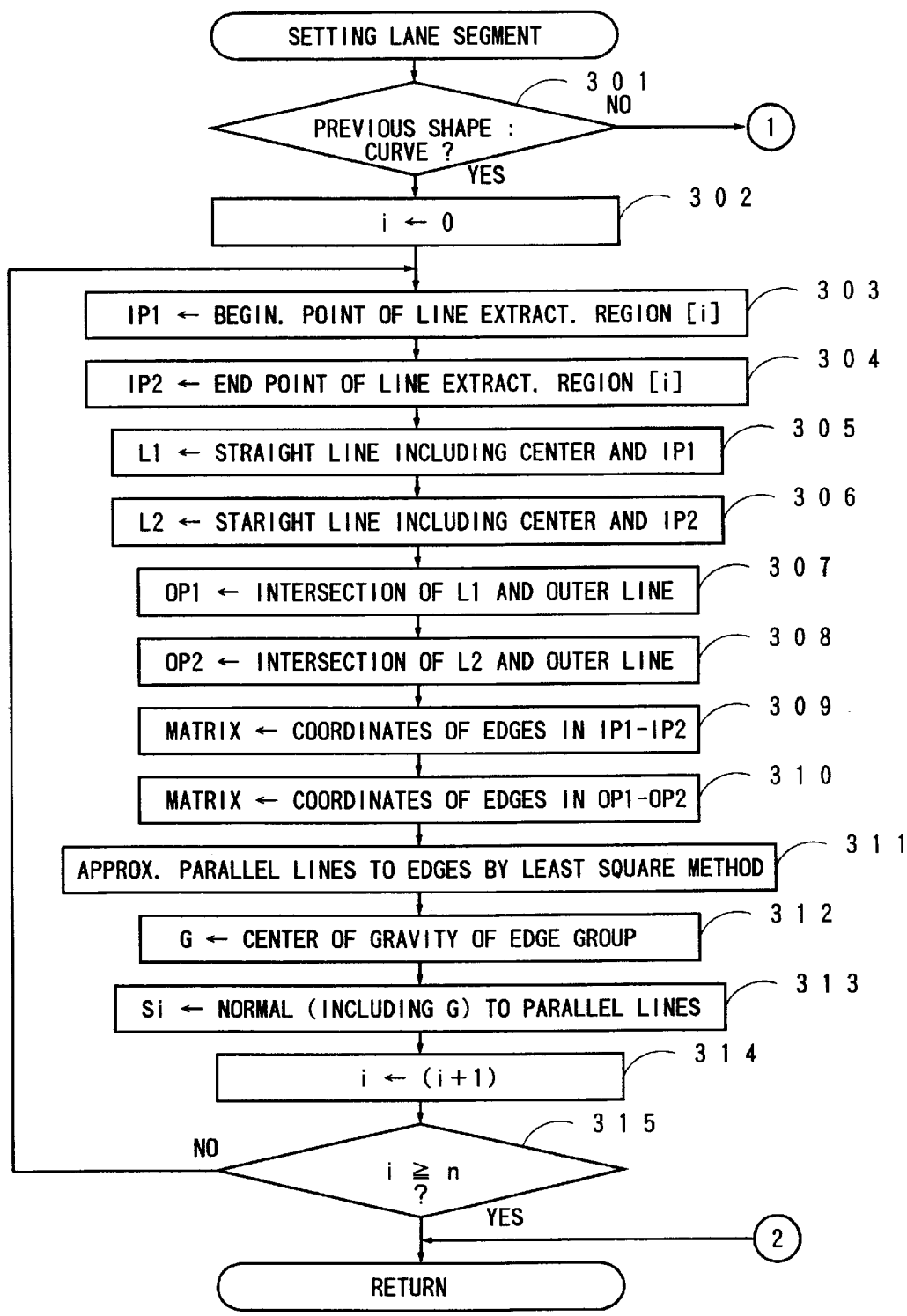
FIG. 17 is a flowchart for setting segments according to a further embodiment of the present invention.
Figure 18:
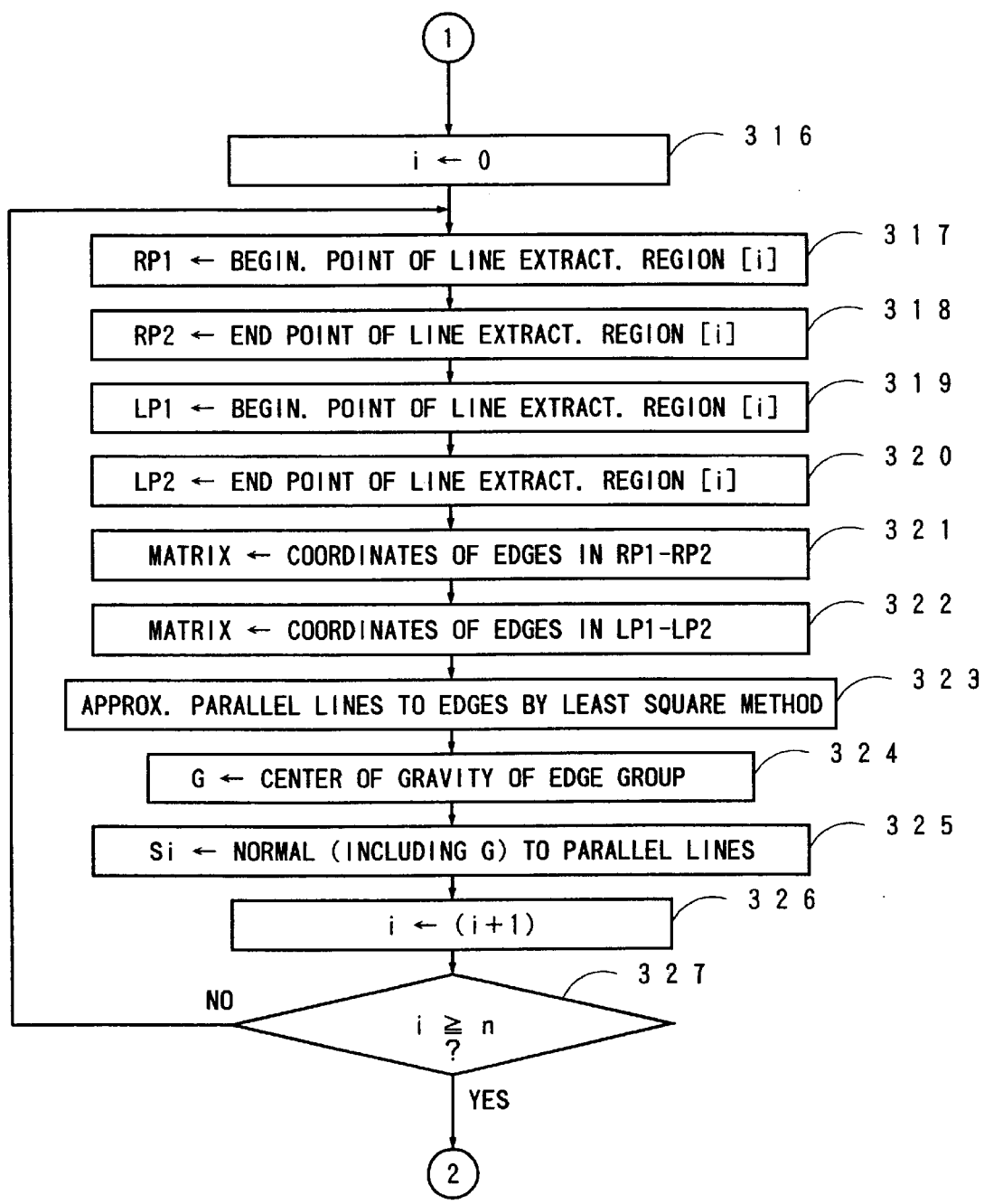
FIG. 18 is a flowchart for setting segments according to a further embodiment of the present invention.
Figure 19:
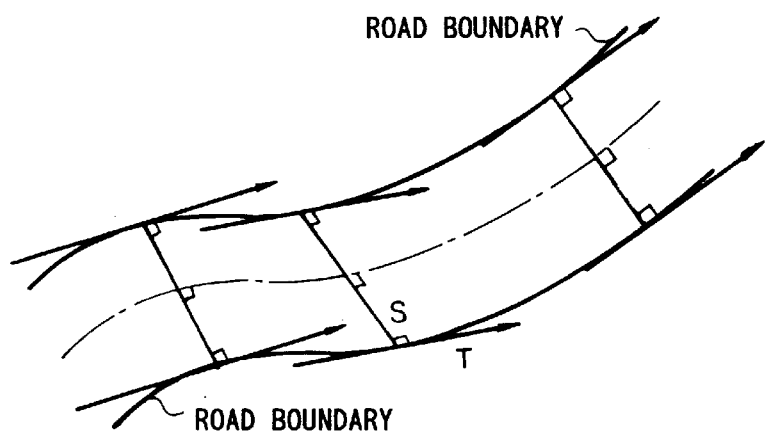
FIG. 19 is a diagram for showing an example of a prior method for setting road segments.
Figure 20:
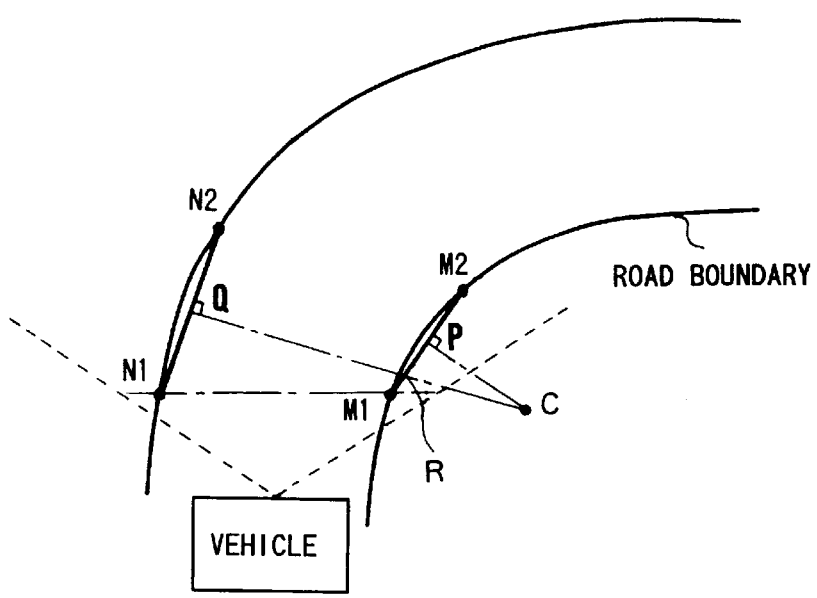
FIG. 20 is a diagram for showing another example of a prior method for setting road segments.

Referring to FIG. 16, the lane detection apparatus according to the further embodiment includes the edge sensor (ED) which is adapted to detect edges indicative of boundaries of opposite sides of each lane on a road on the basis of a density of image information including the opposite sides of the lane. The edge memory (EM) is provided for storing the edges to form a couple of continuous lines of edge groups indicative of the opposite boundaries of the lane. The image processor (DP) is provided for defining the opposite boundaries of the lane on a plane in a three-dimensional geometry, at least on the basis of the lines of the edge groups. The center of curvature defining device (RC) is provided for defining a center of curvature to the opposite boundaries of the lane defined by the image processor (DP). The edge line extracting device (ES) is provided for extracting a pair of edge lines, each of which has a predetermined length along a concentric circle arc having the same center as the center of curvature, from the edge groups stored in the edge memory (EM) to form the continuous lines of edge groups indicative of the opposite boundaries of the lane. The tangent defining device (TL) is provided for defining a couple of tangents to the edge lines extracted from each region, respectively by the edge line extracting device (ES), provided however that the pair of edge lines are parallel. The center of gravity defining device (GC) is provided for defining the center of gravity of edges forming the edge lines. The normal defining device (NL) is provided for defining a normal including the center of gravity to the tangents. And, the segment setting device (SD) is provided for defining a couple of intersections of the normal with the tangents, and setting a line segment between the intersections as a segment of the lane to output the segment of the lane to the image processor (DP). The image processor (DP) is adapted to renew the opposite boundaries of the lane on the basis of the segment of the lane.

Figure 15:
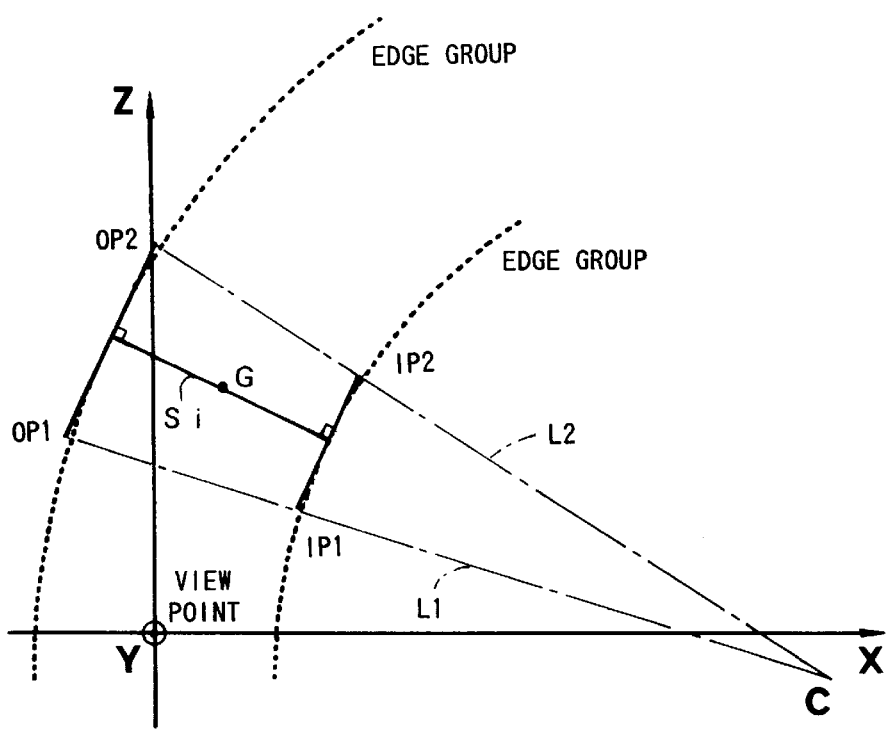
FIG. 15 is a diagram for showing a method for setting segments in a further embodiment of a method for detecting a lane on a road according to the present invention.

The above relationship of the tangents, normal, segment of the lane and center of the curvature is illustrated in FIG. 15 which corresponds to FIG. 1 in part. The details of this embodiment are substantially the same as those illustrated in FIGS. 3 and 4, and the image processing is performed in substantially the same manner as shown in FIGS. 5 to 8, except for Steps 302, 316 in FIGS. 7, 8, which are substituted for FIGS. 17, 18, so that further explanation is omitted.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for detecting a lane on a road, comprising the steps of:

detecting edges indicative of boundaries of opposite sides of each lane on a road on the basis of a density of image information including the opposite sides of said lane;

storing said edges in an edge memory to form a couple of continuous lines of edge groups indicative of the opposite boundaries of said lane;

defining the opposite boundaries of said lane on a plane in a three-dimensional geometry, at least on the basis of said lines of said edge groups;

defining a center of curvature to the opposite boundaries of said lane defined on said plane;

dividing said edge groups stored in said edge memory into a plurality of continuous regions each having a predetermined length along a concentric circle arc having the same center as said center of curvature;

extracting a pair of each lines from each region;

defining a couple of tangents to said edge lines extracted from each region, respectively;

defining a couple of intersections of said normal with said tangents;

setting a line segment between said intersections as a segment of said lane; and renewing the opposite boundaries of said lane on the basis of said segment of said lane, wherein said tangents are a couple of tangents to said edge lines extracted from each region which are assumed to be parallel with each other, and a center of gravity of edges forming said edge lines is defined, and wherein said normal is a normal including said center of gravity.

2. The method as set forth in claim 1, wherein said edges stored in said edge memory to form said continuous lines of edge groups indicative of the opposite boundaries of said lane is divided into a plurality of continuous regions each having a predetermined length along a concentric circle arc having the same center as said center of curvature, with neighboring regions partially overlapped with each other, and extracting a pair of edge lines from each region.

3. An apparatus for detecting a lane on a road, comprising:

edge detection means for detecting edges indicative of boundaries of opposite sides of each lane on a road on the basis of a density of image information including the opposite sides of said lane;

edge memory means for storing said edges to form a couple of continuous lines of edge groups indicative of the opposite boundaries of said lane;

image processing means for defining the opposite boundaries of said lane on a plane in a three-dimensional geometry, at least on the basis of said lines of said edge groups;

center of curvature defining means for defining a center of curvature to the opposite boundaries of said lane defined by said image processing means;

edge line extracting means for dividing said edge groups stored in said edge memory means into a plurality of continuous regions each having a predetermined length along a concentric circle arc having the same center as said center of curvature, and extracting a pair of edge lines from each region;

tangent defining means for defining a couple of tangents to said edge lines extracted from each region, respectively by said edge line extracting means;

normal defining means for defining a normal to said tangents;

segment setting means for defining a couple of intersections of said normal with said tangents, and setting a line segment between said intersections as a segment of said lane to output said segment of said lane to said image processing means, said image processing means renewing the opposite boundaries of said lane on the basis of said segment of said lane, center of gravity defining means for defining a center of gravity of edges forming said edge lines, wherein said tangent defining means is adapted to define said tangents to be extracted from each region which are assumed to be parallel with each other, and wherein said normal defining means is adapted to define said normal to include said center of gravity.

4. The apparatus as set forth in claim 3, wherein said edge line extracting means divides said edge groups stored in said edge memory means into a plurality of continuous regions each having a predetermined length along a concentric circle arc having the same center as said center of curvature, with neighboring regions partially overlapped with each other, and extracting a pair of edge lines from each region.

* * * * *